Oct. 23, 1951     G. P. HINDS. JR., ET AL     2,572,724
PROPYLENE TETRAMER PRODUCTION
Filed May 21, 1949
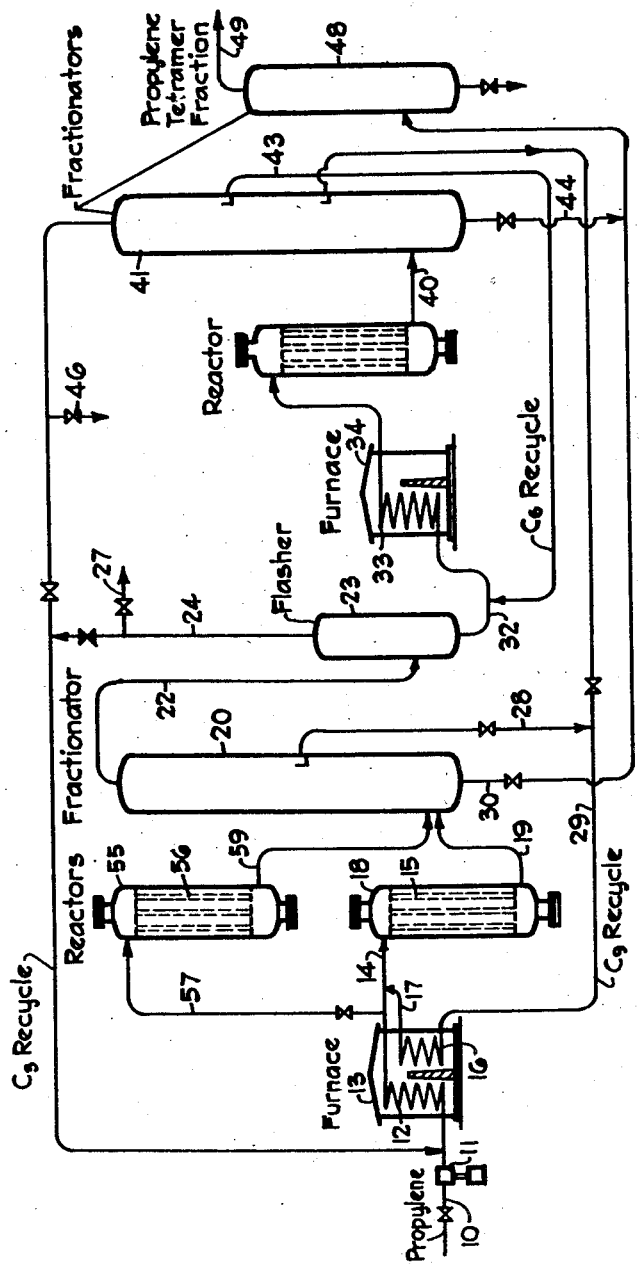
Inventors:
George Putnam Hinds, Jr.
William Keddie Meerbott
Gordon J. Reno
By E. Walter May
their Agent

UNITED STATES PATENT OFFICE 2,572,724

PROPYLENE TETRAMER PRODUCTION

George Putnam Hinds, Jr., Pasadena, and William Keddie Meerbott and Gordon J. Reno, Houston, Tex., assignors to Shell Development Company, San Francisco, Calif., a corporation of Delaware Application May 21, 1949, Serial No. 94,602

11 Claims. (Cl. 260—683.15)

This invention relates to an improved process for producing high yields of propylene tetramer and propylene polymer fractions predominating in $C_{12}$ hydrocarbons by the catalytic polymerization of normally gaseous hydrocarbons comprising propylene.

Propylene tetramer and propylene polymer fractions predominating in polymers having twelve carbon atoms to the molecule are of importance as starting and intermediate materials in the production of valuable chemical products. They find application, for example, as alkylating agents in the production of alkylated aromatic hydrocarbons particularly valuable as starting materials in the production of detergents.

It is an object of the present invention to provide an improved process for the catalytic polymerization of propylene with the aid of polymerization catalysts enabling the efficient production of substantially increased yields of propylene tetramer and propylene polymer fractions predominating in polymers having twelve carbon atoms to the molecule.

Another object of the present invention is the provision of an improved catalytic propylene polymerization process wherein the polymerization is controlled to result in the production of substantially increased yields of propylene polymers consisting predominantly of polymers having twelve carbon atoms to the molecule.

A further object of the invention is the provision of an improved catalytic propylene polymerization process enabling the efficient production of propylene polymers predominating in propylene tetramer with optimum yields and with a minimum production of undesirable polymeric by-products. Other objects and advantages of the invention will become apparent from the following detailed description thereof.

By the terms "propylene tetramer" and "propylene tetramer polymer fraction" as employed throughout the present specification and claims is meant propylene polymer having twelve carbon atoms to the molecule and propylene polymer fractions consisting predominantly of propylene polymers having twelve carbon atoms to the molecule, respectively.

Reliance upon polymerization processes available heretofore as a source of propylene tetramer is handicapped by the fact that the products therein generally obtained often consist of a mixture of polymers having a very wide boiling range and containing a relatively small content of the desired $C_{12}$ polymer. Thus, the polymerization of propylene with the aid of a phosphoric acid catalyst employing space velocities commensurate with practical scale operation often results in relatively low conversions of propylene to polymer at atmospheric pressure or slightly elevated pressures. Furthermore, the polymers thus obtained will generally contain only a relatively small proportion of the desired $C_{12}$ polymers. Executing the process at higher pressures increases the rate of conversion of propylene to polymer. However, this reduces substantially the yield of propylene polymers predominating in $C_{12}$ polymers. Increasing the pressure but maintaining a constant conversion by varying the space velocity will generally result in a still greater reduction in the yield of the desired propylene tetramer.

It has now been found that in the catalytic polymerization of propylene the yield of polymers having twelve carbon atoms to the molecule is greatly increased by control of the boiling range of the polymer fraction recycled to the propylene polymerizing zone. In accordance with the invention substantially increased yields of propylene polymers having twelve carbon atoms to the molecule are obtained in the catalytic polymerization of propylene by separating from the polymeric reaction products a higher boiling fraction comprising propylene polymers having twelve carbon atoms to the molecule, an intermediate polymer fraction comprising polymers having from eight to ten carbon atoms to the molecule, and a lower boiling polymer fraction comprising propylene polymers having from four to seven carbon atoms to the molecule, recycling said intermediate polymer fraction to the propylene polymerizing zone and separately polymerizing the lower boiling polymer fraction.

In a preferred method of carrying out the process of the invention, increased yields of propylene polymers predominating in polymers having twelve carbon atoms to the molecule are obtained in the catalytic polymerization of normally gaseous hydrocarbons comprising propylene by contacting the normally gaseous hydrocarbons in the vapor phase in a first polymerizing zone with a polymerization catalyst such as, for example, a phosphoric acid polymerization catalyst of the solid type, at propylene polymerizing conditions thereby converting propylene to propylene polymers in the first polymerizing zone; separating from the effluence of the first polymerizing zone, a normally gaseous hydrocarbon fraction comprising unconverted propylene, a lower boiling polymer fraction predominating in propylene polymers having six carbon atoms to the molecule, an intermediate polymer fraction predominating in propylene polymers having nine carbon atoms to the molecule, and a higher boiling polymer fraction predominating in propylene polymers having twelve carbon atoms to the molecule; contacting said lower boiling polymer fraction with a polymerization catalyst in a second polymerizing zone at olefin polymerizing conditions converting propylene polymer having six carbon atoms to the molecule to polymeric reaction products comprising propylene polymer having twelve carbon atoms to the molecule; separating from the effluence of the second polymerizing zone a normally gaseous hydrocarbon fraction comprising any propylene present, a lower boiling polymer fraction comprising propylene polymers having six carbon atoms to the molecule, an intermediate polymer fraction comprising polymers having nine carbon atoms to the molecule, and a higher boiling polymer fraction comprising polymers having twelve carbon atoms to the molecule; recycling the lower boiling polymer fraction separated from the effluence of the second polymerizing zone; recycling normally gaseous hydrocarbons and the intermediate polymer fractions separated from the effluence of both polymerizing zones to the first polymerizing zone; and separating polymers consisting essentially of propylene polymers having twelve carbon atoms to the molecule from the higher boiling fractions separated from the effluence of both the first and second polymerizing zones.

In order to set forth more fully the nature of the invention, the following detailed description thereof is made with reference to the attached drawing wherein the single figure represents more or less diagrammatically an elevational view of one form of apparatus suitable for executing the process of the invention.

Referring to the drawing, normally gaseous hydrocarbons comprising propylene are forced through line 10 by means of pump 11 into suitable heating means such as, for example, a heating coil 12 positioned in a furnace structure 13. Propylene employed in the production of propylene tetramer in accordance with the invention may be obtained from any suitable source, and need not consist of substantially pure propylene but may comprise in admixture therewith other hydrocarbons or gaseous materials capable or not of undergoing conversion under the conditions of execution of the polymerization reaction. A suitable propylene charge to the process of the invention comprises the propylene-containing normally gaseous hydrocarbon mixtures separated from the products obtained in the pyrogenic or catalytic treatment of normally gaseous and/or normally liquid hydrocarbons, such as, for example, a $C_3$ hydrocarbon fraction comprising substantial amounts of propylene.

Within heating coil 12 the hydrocarbon stream is heated to a temperature sufficiently high to maintain the polymerizing conditions within the subsequent first polymerizing zone. From heating coil 12 the heated hydrocarbon stream is passed through line 14 into a first polymerizing zone. The first polymerizing zone may comprise any suitable type of reactor enabling efficient contact of reactants and catalyst at propylene polymerizing conditions. A suitable reaction zone comprises, for example, a plurality of catalyst-containing reactor tubes 15 positioned in an enlarged chamber 18.

Within reactor tubes 15 the hydrocarbon charge is contacted with a polymerization catalyst at propylene polymerizing conditions. Catalysts employed in the production of propylene tetramer in accordance with the invention comprise any of the known phosphoric acid polymerizing catalysts of the solid type. Such catalysts comprise phosphoric acid deposited upon a support material such as kieselguhr, alumina, charcoal, fuller's earth and the like. Although a phosphoric acid polymerization catalyst has been chosen as the preferred catalyst in the present illustrative description, the invention is in no wise limited to the use of catalysts of this particular type in the first polymerizing zone and other olefin polymerization catalysts capable of converting propylene to normally liquid polymers comprising polymers having twelve carbon atoms to the molecule may be employed within the scope of the invention.

Suitable propylene polymerizing conditions maintained within reactor tubes 15 when employing a catalyst of the phosphoric acid type comprise a temperature in the range of from about 150 to about 300° C., and preferably from about 235 to about 275° C., and pressures in the range of from about 150 to about 2000 pounds and preferably from about 300 to about 1500 pounds. Space velocities in the range of, for example, from about 0.20 to about 0.75 gallon of propylene charge, per pound of catalyst, per hour are preferred. Small amounts of water preferably in the range from about 0.1 to about 0.2 per cent by weight of the propylene feed, are added to the charge to the polymerizing zone. Particularly preferred conditions to be maintained in the reactor tubes 15 when employing a phosphoric acid type catalyst comprise a temperature of about 245° C., a pressure of about 1000 pounds, and a space velocity of 0.5 gallon of propylene feed per pound of catalyst per hour.

Under the above defined conditions propylene will be converted to propylene polymers. In the absence of any return of polymer lower boiling than the desired propylene tetramer to the reaction zone the polymeric product obtained will generally comprise relatively small amounts of propylene tetramer and consist predominantly of polymer which is lower boiling than the propylene tetramer. Recycling back to the first polymerizing zone substantially all polymer lower boiling than the desired propylene tetramer polymer fraction at a recycle ratio of recycled polymer to propylene charge of from about 1:1 to 2:1 does generally not result in any material change in the amount of propylene tetramer produced. In copending application Serial No. 82,115, filed March 8, 1949, a method is disclosed and claimed whereby the yield of propylene tetramer is substantially increased in the vapor phase polymerization of propylene by maintaining a high ratio of recycled polymer to propylene charge. It has been found, however, that substantially increased yields of propylene tetramer are obtained by avoiding the presence in the polymer which is recycled to the first propylene polymerizing zone of any substantial amount of polymers having less than eight carbon atoms to the molecule.

In accordance with the invention the effluence from reactor tubes 15 is passed through line 19 into a suitable fractionator 20. Within fractionator 20 there is separated an overhead fraction comprising unconverted hydrocarbons having less than eight carbon atoms to the molecule, an intermediate polymer fraction comprising polymers having from eight to ten carbon atoms to the molecule and bottoms comprising propylene polymers having more than 10 carbon atoms to the molecule. The overhead fraction passed from fractionator 20 through line 22 into a flashing zone such as, for example, flash drum 23. Within flash drum 23 normally gaseous hydrocarbon comprising any unconverted propylene is flashed from normally liquid products comprising hydrocarbons having from four to seven carbon atoms to the molecule. Normally gaseous hydrocarbons are vented from drum 23 through line 24 and are passed in part or entirely by means of valved line 25 into charge line 10. A valved line 27 is provided for the elimination of such normally gaseous hydrocarbons from the system.

The intermediate polymer fraction comprising hydrocarbons having from eight to ten carbon atoms to the molecule is passed from fractionator 20 through valved lines 28 and 29, heating coil 16, and line 17 into line 14. Liquid bottoms are taken from fractionator 20 by means of valved line 30.

The boiling ranges of the fractions separated within fractionator 20 and flash drum 23 will of course vary to some extent with variations in operating conditions. The operation is, however, controlled to assure the concentration of substantially all propylene polymer having six carbon atoms to the molecule in the liquid bottoms of flash drum 23, substantially all propylene polymer having nine carbon atoms to the molecule in the intermediate polymer fraction recycled through line 23 and all propylene polymer having twelve carbon atoms to the molecule in the bottoms of fractionator 20. In the production of propylene tetramer in accordance with the invention from normally gaseous hydrocarbon fractions comprising propylene, with the aid of a phosphoric acid catalyst, excellent results have been obtained with control of conditions in fractionator 20 and flash drum 23 so that the lower boiling polymer fraction separated as a liquid fraction in flash drum 23 had a boiling range of from about 60 to about 125° C. and the intermediate polymer fraction recycled through line 28 had a boiling range of from about 125 to 155° C.

The following example illustrates the substantially increased yields of propylene tetramer polymer fraction obtained in the first polymerizing zone to the process of the invention by avoiding the presence in the polymer recycled thereto any substantial amount of polymer having less than eight carbon atoms to the molecule.

EXAMPLE I

In an operation "A" propylene was polymerized by contacting a normally gaseous hydrocarbon fraction consisting of 61.4 mol percent propylene, 38.2 mol percent propane and 0.4 mol percent isobutane with a solid type phosphoric acid polymerization catalyst at a temperature of 240° C., a pressure of 350 p. s. i. g., and at a space velocity of about 0.27 gallon of propylene charge per pound of catalyst per hour. A propylene tetramer polymer fraction (boiling range 180–260° C.) was separated from the polymeric reaction products and all the remaining polymers lower boiling than the propylene tetramer fraction and consisting predominantly of polymers having six and 9 carbon atoms to the molecule were recycled to the reaction zone. A recycle ratio of recycled polymer to propylene charged of 1.7 was maintained.

In a second and separate operation, operation "B," run A was repeated under substantially identical conditions with the exception that the polymers remaining after separation of the propylene tetramer fraction were fractionated to separate a polymer fraction comprising hydrocarbons having from 4 to 7 carbon atoms and consisting predominantly of polymers having six carbon atoms to the molecule therefrom and recycling only this $C_6$ polymer fraction (boiling range 60–125° C.) to the reaction zone.

In a third operation, operation "C," substantially identical conditions were again maintained with the exception that the lower boiling polymers remaining after separation of the propylene tetramer fraction were fractionated to separate a polymer fraction comprising hydrocarbons having from 8 to 10 carbon atoms and predominating in polymers having nine carbon atoms therefrom (boiling range 125–155° C.) and only the $C_9$ polymer fraction thus separated from the polymeric products was recycled to the reaction zone.

The results obtained in each of the above operations A, B and C are tabulated in the following table.

Table I

| Run | "A" | "B" | "C" |
|---|---|---|---|
| Recycle Charge | All polymer boiling below propylene tetramer fraction | $C_6$ Fraction | $C_9$ Fraction |
| Mol per cent propylene conversion | 73 | 78 | 71 |
| Vol. per cent propylene tetramer polymer fraction in total polymeric product | 11.5 | 11.2 | 15.5 |
| Vol. propylene tetramer fraction produced per vol. of propylene charged | 0.24 | 0.24 | 0.34 |
| Vol. propylene tetramer fraction produced per vol. of propylene reacted | 0.37 | 0.30 | 0.48 |

From the foregoing example it is seen that the boiling range of the recycled polymers has a marked effect upon propylene tetramer production. About 35% more propylene tetramer polymer fraction was obtained in the total liquid polymeric products when only the $C_9$ polymer fraction was recycled to the reaction zone than was obtained when either all remaining polymer or only a $C_6$ polymer fraction was recycled to the reaction zone. The recycling of only the $C_9$ polymer fraction also results in a substantial increase in yield of propylene tetramer per volume of propylene reacted and propylene charged. When the $C_6$ polymer fraction was employed as recycle stream somewhat greater propylene conversion was obtained but the propylene tetramer yield in the total liquid polymeric product was no more than that obtained when recycling back the full range of polymers lower boiling than the propylene tetramer fraction.

Without intent to limit the scope of the present invention by any theory presented herein to set forth more fully its nature, it is believed that the substantially increased yields obtained of propylene tetramer resulting directly from a limitation of the boiling range of the recycled polymers is attributable to the fact that in the first polymerizing zone the presence of both propylene and higher boiling olefins (recycled polymers) results in a plurality of competing reactions comprising the dimerization of propylene and the addition of propylene to a higher olefin (recycled polymer). The propylene dimerization reaction appears to proceed at a substantially faster rate than the addition reaction. It has furthermore been found that the addition of propylene to $C_5$ and $C_6$ olefins under these conditions proceeds at a substantially more rapid rate than the addition of propylene to higher olefins such as $C_9$ olefins. Due to the absence of olefins lower boiling than $C_8$ in the recycled polymer fraction in the process of the invention the possibility of the addition reaction resulting in a molecule of tetramer is greatly enhanced. Thus, it is seen from the foregoing example that a 35% increase in production of the desired propylene tetramer polymer fraction is obtained by avoiding the presence of the lower boiling polymers predominating in polymers having less than eight carbon atoms to the molecule in the stream of recycled polymers passed to the propylene polymerizing zone.

To further increase the production of propylene tetramer in the propylene polymerizing zone a relatively high ratio of recycled polymer to propylene charge is preferably maintained. The maintenance of a ratio of recycled polymer to propylene feed in the ratio of from about 1:5 to about 14:1 and preferably from about 2:1 to about 10:1 gives optimum results.

Liquid polymer consisting essentially of hydrocarbons having less than eight carbon atoms to the molecule and consisting predominantly of propylene polymers having six carbon atoms to the molecule, is taken from flash drum 23 and passed through line 32 into a suitable heating means such as, for example, an externally heated coil 33 positioned in a furnace structure 34. In coil 33 the hydrocarbon stream is heated to a temperature sufficiently high to maintain the desired conditions of temperature in a second polymerization zone of the process. From coil 33 the heated hydrocarbon stream is passed through line 35 into a suitable second polymerization zone. The second polymerization zone of the process may comprise any suitable type of reactor or plurality of reactors enabling the conversion of the polymer predominating in polymers having six carbon atoms in the molecule to polymers predominating in propylene tetramer. A suitable reactor comprises, for example, a plurality of catalyst-containing tubes 36 positioned in a suitable chamber 37 enabling the contact of heat controlling fluid with the external walls of the tubes. Within catalyst tubes 36 the polymer stream is contacted with a suitable polymerization catalyst assuring the conversion of the lower boiling polymer to propylene tetramer. Since the lower boiling polymer fraction consists predominantly of polymers having six carbon atoms to the molecule the maintenance of conditions particularly suitable to the dimerization of propylene polymer having six carbon atoms to the molecule is particularly suitable. Suitable conditions to be maintained in reactor tubes 36 comprise, for example, the use of a catalyst such as, for example, a phosphoric acid polymerization catalyst, a temperature of from about 150 to about 300° C., preferably from about 235 to about 275° C., and a pressure of from about 150 to about 1500 p. s. i. g. Liquid hourly space velocities of from about 0.10 to about 0.75 gallons of charge per pound of catalyst, per hour are suitable.

Although the use of a polymerization catalyst of the phosphoric acid type has been set forth above as the catalyst to be employed in reactor tubes 36, it is to be understood that the invention is not limited to the use of a specific catalyst to effect the conversion of the lower boiling polymer fraction to the desired propylene tetramer. Thus, other polymerization catalyst such as, for example, sulfuric acid, concentrated ortho phosphoric acid, etc., may be suitably employed as the catalyst in the second polymerization zone of the process. It is to be understood that the particular conditions employed to effect the conversion of the lower boiling polymer to polymer comprising propylene tetramer will depend to some extent upon the particular polymerization catalyst employed. Thus, when employing sulfuric acid as catalyst, preferred conditions comprise the use of a temperature of from about 25 to about 100° C. Particularly suitable conditions for the dimerization of the $C_6$ polymer comprise the use of sulfuric acid of 67 to 75% strength, or even higher strength at 50 to 90° C., an acid to hydrocarbon volume ratio of 0.5 to 1.0 and a contact time of from 5 to 35 minutes.

Under the above defined conditions lower boiling propylene polymers consisting of polymers having less than eight carbon atoms to the molecule and predominating in polymers having six carbon atoms to the molecule are converted to polymers predominating in polymers having 12 carbon atoms to the molecule.

In the process of the invention the avoidance of the passage of any substantial amount of lower boiling polymer into the first polymerizing zone and the absence of any substantial amount of propylene into the second polymerizing zone enables the separate conversion of the lower boiling polymer to polymers comprising propylene tetramer to proceed under conditions assuring the production of the propylene tetramer polymer with high yields.

EXAMPLE II

The polymers obtained in the polymerization of propylene in the vapor phase with the aid of a phosphoric acid polymerization catalyst were fractionated to separate therefrom a lower boiling polymer fraction boiling in the range of from 40 to 75° C., and predominating in polymers having six carbon atoms to the molecule. Portions of the $C_6$ polymer fraction thus obtained were subjected to polymerization in the presence of a phosphoric acid polymerization catalyst of the solid type under the conditions set forth in the following table. The polymeric products obtained were fractionated to separate therefrom a propylene tetramer fraction (boiling range 182° C. to 285° C.) and predominating in polymers having twelve carbon atoms to the molecule. The amount conversion of olefins to polymers in percent by volume of olefins charged, and the yield of propylene tetramer fraction in terms of volume of propylene tetramer fraction obtained per volume of olefin charged and olefin reacted are also set forth in the following table.

Table II

| Run No. | 1 | 2 | 3 |
|---|---|---|---|
| Olefin in charge, per cent by volume | 70 | 70 | 70 |
| Operating conditions: | | | |
| Pressure, p. s. i. g. | 1,000 | 1,000 | 350 |
| Temperature, °C | 241 | 262 | 243 |
| Space velocity, gals./lbs./hr | 0.194 | 0.194 | 0.194 |
| Results: Olefin conversion, per cent by volume | 67 | 72 | 48 |
| Per cent by vol. of propylene tetramer fraction in total liquid polymer obtained | 32.8 | 34.6 | 28.3 |
| Vol. of propylene tetramer fraction obtained per vol. of olefin charged | 0.15 | 0.20 | 0.07 |
| Vol. of propylene tetramer fraction obtained per vol of olefin reacted | 0.23 | 0.27 | 0.15 |

The suitability of sulfuric acid as catalyst to be employed in the second polymerization zone of the process is illustrated by the following example:

EXAMPLE III

In a plurality of separate operations $C_6$ olefinic hydrocarbon fractions were polymerized with the aid of sulfuric acid as the catalyst shown in the following table. The polymeric products obtained under the operating conditions were fractionated to separate a propylene tetramer polymer fraction (boiling range 182–270° C. therefor). Results obtained are indicated in the following table:

*Table III*

| Run | 4 | 5 | 6 | 7 |
|---|---|---|---|---|
| Per cent olefins in charge | 52 | 45 | 45 | 63 |
| Operating conditions: | | | | |
| Contact time, min | 30 | 15 | 15 | 15 |
| Temperature, ° C | 91 | 91 | 86 | 91 |
| $H_2SO_4$ strength, per cent w | 75 | 75 | 75 | 75 |
| Ratio $H_2SO_4$ to hydrocarbon charge | 1 | 1 | 1 | 1 |
| Results: | | | | |
| Olefin conversion, per cent by volume | 82 | 66 | 73 | 78 |
| Per cent by volume of propylene tetramer fraction in total liquid polymer obtained | 27.3 | 14.5 | 15.6 | 16.7 |
| Volume propylene tetramer fraction obtained per vol. olefin charged | 0.44 | 0.31 | 0.34 | 0.26 |
| Volume propylene tetramer fraction obtained per vol. olefin reacted | 0.54 | 0.46 | 0.47 | 0.33 |

Effluence from reactor tubes 36 is passed through line 40 into a fractionator 41. Within fractionator 41 a lower boiling polymer fraction consisting essentially of polymers having less than eight carbon atoms to the molecule, and a higher boiling polymer fraction comprising propylene tetramer is separated from the effluence emanating thereto from reactor tubes 36. The lower boiling polymer fraction is recycled from fractionator 41 through line 43 into line 32. The higher boiling polymer fraction comprising propylene tetramer is taken from fractionator 41 by means of valved line 44.

Within fractionator 41 there is also separated an overhead fraction comprising all hydrocarbons having less than five carbon atoms to the molecule and an intermediate polymer fraction comprising polymers having from eight to ten carbon atoms to the molecule. The overhead fraction is taken from fractionator 41 through line 25 to charge line 10. A valved line 46 is provided for the elimination of at least a part of the overhead from fractionator 41 from the system. The intermediate polymer fraction comprising polymers having from eight to ten carbon atoms to the molecule is passed from fractionator 41 through line 29 to charge line 10.

It is seen that in the process of the invention the passage of any polymers having less than eight carbon atoms to the molecule into the first polymerization zone to which propylene is charged is avoided. Similarly the passage of any substantial amounts of propylene into the second polymerization zone to wherein the $C_6$ polymers are dimerized is also obviated. The $C_9$ polymer, on the other hand, which is capable of undergoing the addition reaction with propylene, is passed from the effluence of both the first and second polymerization zones into the first polymerization zone. The high efficiency of the process of the invention is directly attributable to at least a substantial degree to the separate execution of mutually competitive reactions under conditions enabling the obtaining of a maximum production of the desired propylene tetramer with a minimum formation of polymers other than the desired propylene tetramer.

Higher boiling polymer comprising propylene polymers having 12 carbon atoms to the molecule separated in fractionators 20 and 41 is taken therefrom through valved lines 30 and 44, respectively, and passed in combined stream to a fractionator 48. Within fractionator 48 the higher boiling polymers are fractionated to separate a propylene tetramer polymer fraction consisting predominantly of polymers having 12 carbon atoms to the molecule from a high boiling polymeric fraction predominating in polymers having more than 12 carbon atoms to the molecule. The propylene tetramer polymer fraction is taken overhead from fractionator 48 through valved line 49 as a final product. Higher boiling polymeric bottoms are taken from fractionator 48 through line 50 and eliminated from the system.

The actual boiling range of the higher boiling polymer fractions separated in fractionator 20 and 41 as bottoms will obviously vary to some extent with the particular operating conditions employed. Thus, the bottoms separated in fractionators 20 and 41 may have a minimum boiling temperature of, for example, about 180° C. The propylene tetramer polymer fraction separated overhead in fractionator 48 as the final propylene tetramer product may have a boiling range of, for example, from about 180 to about 265° C. It is to be understood, however, that the invention is in no wise limited by any specific boiling range of the fraction predominating in $C_{12}$ hydrocarbons separated as the final product in the process of the invention.

In the foregoing detailed description of the invention, the first polymerization zone is represented by a single reactor 18. It is to be understood that the first polymerization zone of the process of the invention may comprise two or more reactors connected in series or parallel with one another. In a preferred method of carrying out the invention, at least two reactors are comprised in the first polymerization zone. A portion of the total propylene charge to the process is charged to each reactor comprised in the first polymerization zone, and recycled polymer is charged to all but one reactor of the first polymerization zone. Thus, referring to the drawing, a portion of the heated propylene stream emanating from coil 12 may be diverted from line 14, through valved line 57 into a separate reactor 55 containing reaction tubes 56 maintained at propylene polymerizing conditions resulting in the conversion of propylene to normally liquid polymer therein. Catalyst and conditions maintained within tubes 56 may be substantially those prescribed as suitable for catalyst tubes 15. The remainder of the propylene stream emanating from coil 12 is passed through line 14 into reactor 18. All of the recycled $C_9$ polymer fraction, however, is passed from coil 16 through line 17 into line 14, care being taken to avoid the passage of any substantial amount of such recycled polymer into line 57 and to assure its entry into reactor 18.

Effluence from reactor 55 is passed through line 59 into fractionator 20 to be fractionated therein, together with the effluence of reactor 15, substantially as described in the foregoing detailed description of the invention. Although effluence from both reactors is passed to a single fractionator 20 in the present illustrative description, it is to be understood that in practical operation more than one fractionator may be employed within the scope of the invention to effect the indicated product separation. Effluence from each of the reactors 15 and 56, furthermore, may be passed to separate fractionating zones, not shown in the drawing. In the preferred method of operation reactor 56 may function to produce C₉ polymers in sufficient amount to maintain a relatively high propylene throughput through reactor 18 while still maintaining optimum conditions, such as prescribed ratio of recycled polymer to propylene, therein. Such utilization of a plurality of reactors in the first polymerization zone of the process, with the passage of fresh propylene charge to each of such reactors while restricting the passage of recycled polymer to but a portion of such reactors, makes possible not only substantially increased propylene throughput but a corresponding substanitally increased propylene tetrameter production.

The following example is illustrative of the production of propylene polymer consisting essentially of propylene tetramer in accordance with the invention employing a plurality of reactors in the first polymerization zone.

EXAMPLE IV

In a continuous operation a C₃ hydrocarbon fraction containing 60% by volume of propylene is contacted at the rate of 429 barrels per day with a phosphoric acid catalyst positioned in two separate reactors "I" and "II." Of the total C₃ hydrocarbon charge a portion is charged to each of the reactors I and II. Propylene polymerizing conditions are maintained in reactors I and II resulting in the conversion of propylene to liquid polymers. Effluence from reactors I and II is fractionated to separate a C₆ fraction, a C₉ fraction and a propylene tetramer fraction therefrom. The C₆ fraction is charged to a third reactor "III" wherein it is dimerized by contact with a phosphoric acid catalyst at C₆ olefin dimerizing conditions. Effluence from reactor III is fractionated to separate a C₆ fraction, a C₉ fraction and a propylene tetramer fraction therefrom. C₉ fraction separated from the effluence of reactors I, II and III is recycled to the inlet of reactor II. In the following table are indicated the charge to, and product from, each of the reactors I, II and III, as well as the conditions maintained therein.

*Table IV*

|  | Reactor I | Reactor II | Reactor III |
|---|---|---|---|
| Catalyst charge, lbs | 1,880 | 1,000 | 1,300 |
| Charge, bbls./day: |  |  |  |
| C₃ fraction | 270 | 71 | 0 |
| C₆ fraction | 0 | 0 | 80.5 |
| C₉ fraction | 0 | 72 | 0 |
| Conditions: |  |  |  |
| Space velocity, gals./lb./hr | 0.25 | 0.25 | 0.194 |
| Pressure, p. s. i. g | 350 | 350 | 1,000 |
| Temperature, °C | 243 | 240 | 270 |
| Recycle ratio, C₉ polymer/C₃⁻ fraction |  | 1.7 |  |
| Effluent bbls./day: |  |  |  |
| C₃ fraction | 147.5 | 41 | 0 |
| C₆ fraction (30–100° C.) | 9.5 | 68 | 40 |
| C₉ fraction (100–175° C.) | 38 | 10 | 24 |
| Propylene tetramer (180–265° C.) | 36 | 14.5 | 11.5 |

This is therefore a production of 0.41 volume of propylene tetramer polymer for every volume of propylene reacted.

The invention claimed is:

1. In a process for the production of propylene polymer wherein normally gaseous hydrocarbons comprising propylene are contacted with a polymerization catalyst at propylene polymerizing conditions in a propylene polymerizing zone, thereby converting propylene to reaction products comprising propylene polymer in said propylene polymerizing zone, and effluence from said propylene polymerizing zone is passed into a product separating zone, the method of increasing the propylene tetramer content of the proplyene polymer produced in said process which comprises, separating from said effluence in said product separating zone a normally gaseous fraction comprising propylene, a lower boiling polymer fraction comprising hydrocarbons having from four to seven carbon atoms to the molecule, an intermediate polymer fraction comprising polymers having from eight to ten carbon atoms to the molecule and a higher boiling polymer fraction comprising propylene tetramer, recycling said normally gaseous fraction and said intermediate polymer fraction to said propylene polymerizing zone in the absence of any substantial amount of hydrocarbons having from four to seven carbon atoms to the molecule, and contacting said lower boiling polymer fraction with a polymerization catalyst in a second and separate polymerization zone in the absence of any substantial amount of propylene at olefin polymerizing conditions thereby converting said lower boiling polymer fraction to reaction products comprising polymers having twelve carbon atoms to the molecule.

2. In a process for the production of propylene polymer wherein normally gaseous hydrocarbons comprising propylene are contacted with a phosphoric acid polymerization catalyst in a propylene polymerizing zone, thereby converting propylene to reaction products comprising propylene polymer in said propylene polymerizing zone, and effluence from said propylene polymerizing zone is passed into a product separating zone, the method of increasing the propylene tetramer content of the propylene polymer produced in said process which comprises, separating from said effluence in said product separating zone a normally gaseous fraction comprising propylene, a lower boiling polymer fraction predominating in polymer having six carbon atoms to the molecule, an intermediate polymer fraction predominating in polymer having nine carbon atoms to the molecule and a higher boiling polymer fraction comprising propylene tetramer, recycling said normally gaseous fraction and said intermediate polymer fraction to said propylene polymerizing zone in the absence of any substantial amount of hydrocarbons having from four to seven carbon atoms to the molecule, and contacting said lower boiling polymer fraction with a phosphoric acid polymerization catalyst in a separate polymerizing zone in the absence of any substantial amount of propylene under olefin polymerizing conditions effecting the dimerization of polymer having six carbon atoms to the molecule to propylene tetramer.

3. In a process for the production of propylene polymer wherein normally gaseous hydrocarbons comprising propylene are contacted with a phosphoric acid polymerization catalyst in a propylene polymerizing zone thereby converting said normally gaseous hydrocarbons to reaction products comprising propylene polymers, and effluence from said propylene polymerizing zone is passed into a product separating zone, the method of increasing the propylene tetramer content of the propylene polymer produced in said process which comprises, separating from said effluence in said product separating zone a normally gaseous fraction comprising propylene, a lower boiling polymer fraction having a boiling range of from about 60 to about 125° C., an intermediate polymer fraction having a boiling range of from about 125 to about 155° C., and a higher boiling polymer fraction comprising propylene tetramer, recycling said normally gaseous fraction and said intermediate polymer fraction to said propylene polymerizing zone in the absence of any substantial amount of reaction products boiling in the range of about 60 to about 125° C., and contacting said lower boiling polymer fraction with a phosphoric acid polymerization catalyst in a separate polymerizing zone at olefin polymerizing conditions converting polymer having six carbon atoms to the molecule to polymer having twelve carbon atoms to the molecule.

4. The process for the production of propylene polymer predominating in propylene tetramer which comprises contacting normally gaseous hydrocarbons comprising propylene with a polymerization catalyst in a first reaction zone under propylene polymerizing conditions, thereby converting said normally gaseous hydrocarbons to reaction products comprising propylene polymer separating from the effluence of said first reaction zone a normally gaseous fraction comprising propylene, a lower boiling polymer fraction comprising hydrocarbons having from four to seven carbon atoms to the molecule, an intermediate polymer fraction comprising polymers having from eight to ten carbon atoms to the molecule and a higher boiling polymer fraction comprising proplyene tetramer, contacting said lower boiling polymer fraction with a polymerization catalyst in a second reaction zone under olefin polymerizing conditions in the absence of any substantial amount of propylene, thereby converting said lower boiling polymer fraction to polymer comprising propylene tetramer, separating from the effluence of said second reaction zone an intermediate polymer fraction comprising polymer having from eight to ten carbon atoms to the molecule and a higher boiling polymer fraction comprising propylene tetramer, and recycling said intermediate polymer fractions separated from said first and second reaction zones to said first reaction zone in the absence of any substantial amount of hydrocarbons having from four to seven carbon atoms to the molecule.

5. The process for the production of propylene polymer predominating in propylene tetramer which comprises contacting normally gaseous hydrocarbons comprising propylene with a phosphoric acid polymerization catalyst in a first reaction zone under propylene polymerizing conditions, thereby converting said normally gaseous hydrocarbons to reaction products comprising propylene polymer in said first reaction zone, separating a lower boiling polymer fraction comprising propylene polymer having six carbon atoms to the molecule, an intermediate polymer fraction comprising polymer having nine carbon atoms to the molecule, and a higher boiling polymer fraction comprising propylene tetramer from the effluence of said first reaction zone, contacting said lower boiling polymer fraction with a phosphoric acid polymerization catalyst under olefin polymerizing conditions in the absence of any substantial amount of propylene in a second reaction zone, thereby converting said lower boiling polymer fraction to reaction products comprising propylene tetramer, separating an intermediate polymer fraction comprising polymer having nine carbon atoms to the molecule and a higher boiling polymer fraction comprising propylene tetramer from the effluence of said second reaction zone, and recycling said intermediate fractions emanating from said first and second reaction zones to said first reaction zone in the absence of any substantial amount of hydrocarbons having from four to seven carbon atoms to the molecule.

6. The process for the production of propylene polymer predominating in polymer having twelve carbon atoms to the molecule which comprises contacting said normally gaseous hydrocarbons with a phosphoric acid polymerization catalyst in a first reaction zone under propylene polymerizing conditions, thereby converting propylene to propylene polymers, separating from the effluence of said first reaction zone a lower boiling polymer fraction having a boiling range of from about 60 to about 125° C., an intermediate polymer fraction having a boiling range of from about 125 to about 155° C., and a higher boiling polymer fraction comprising polymer having twelve carbon atoms to the molecule, contacting said lower boiling polymer fraction with a phosphoric acid polymerization catalyst in a second polymerizing zone under olefin polymerizing conditions in the absence of any substantial amount of propylene, thereby converting said lower boiling fraction to reaction products comprising polymers having twelve carbon atoms to the molecule, separating an intermediate polymer fraction having a boiling range of from about 125 to about 155° C., and a higher boiling polymer fraction comprising polymers having twelve carbon atoms to the molecule from the effluence of said second reaction zone, and recycling said intermediate polymer fractions emanating from said first and second reaction zones to said first reaction zone in the absence of any substantial amount of hydrocarbons having from four to seven carbon atoms to the molecule.

7. The process for the production of propylene polymers consisting essentially of propylene tetramer which comprises contacting normally gaseous hydrocarbons comprising propylene with a phosphoric acid polymerization catalyst at propylene polymerizing conditions in a first reaction zone, thereby converting said normally gaseous hydrocarbons to reaction products comprising propylene polymer in said first reaction zone, separating a normally gaseous fraction comprising propylene, a lower boiling polymer fraction predominating in polymer having six carbon atoms to the molecule, an intermediate polymer fraction predominating in polymers having nine carbon atoms to the molecule and a higher boiling polymer fraction comprising propylene tetramer from the effluence of said first reaction zone, contacting said lower boiling polymer fraction with a phosphoric acid polymerization catalyst in a second reaction zone under olefin polymerizing conditions thereby converting polymer having six carbon atoms to the molecule to reaction products comprising propylene tetramer in said second reaction zone, separating a lower boiling polymer fraction predominating in polymer having six carbon atoms to the molecule, an intermediate polymer fraction predominating in polymer having nine carbon atoms to the molecule, and a higher boiling polymer fraction predominating in polymer having twelve carbon atoms to the molecule from the effluence of said second reaction zone, recycling said lower boiling polymer fraction emanating from said second reaction zone to the inlet of said second reaction zone, recycling said normally gaseous fraction and said intermediate polymer fractions emanating from both reaction zones to said first reaction zone in the absence of any substantial amount of hydrocarbons having from four to seven carbon atoms to the molecule.

8. In a propylene polymerization process wherein normally gaseous hydrocarbons comprising propylene are contacted with a polymerization catalyst at propylene polymerizing conditions in a plurality of reaction zones arranged in parallel flow, and effluence from said reaction zones is passed into a product separating zone, the method of increasing the production of propylene tetramer which comprises, separating from said effluence in said product separating zone a normally gaseous fraction comprising unconverted propylene, a polymer fraction of intermediate boiling range predominating in polymers having from eight to ten carbon atoms to the molecule and a higher boiling polymer fraction comprising propylene tetramer, and recycling said polymer fraction of intermediate boiling range to all but one of said reaction zones, thereby polymerizing propylene in the absence of any recycled polymer in one of said reaction zones, and polymerizing propylene in the presence of recycled polymer of intermediate boiling range but in the absence of any substantial amount of polymers having less than eight carbon atoms to the molecule in all but one of said reaction zones.

9. In a propylene polymerization process wherein normally gaseous hydrocarbons comprising propylene are contacted with a polymerization catalyst at propylene polymerizing conditions in a plurality of reaction zones arranged in parallel flow, and effluence from said reaction zones is passed into a product separating zone, the method of increasing the production of propylene tetramer which comprises, separating from said effluence in said product separating zone a normally gaseous fraction comprising unconverted propylene, a polymer fraction predominating in polymers having nine carbon atoms to the molecule and a higher boiling polymer fraction comprising propylene tetramer, and recycling said polymer fraction predominating in polymers having nine carbon atoms to the molecule to all but one of said reaction zones, thereby polymerizing propylene in the absence of any recycled polymer in one of said reaction zones, and polymerizing propylene in the presence of recycled polymer predominating in polymers having nine carbon atoms to the molecule but in the absence of any substantial amount of polymers having less than nine carbon atoms to the molecule in all but one of said reaction zones.

10. In a propylene polymerization process wherein a normally gaseous hydrocarbon feed comprising propylene is contacted with a polymerization catalyst at propylene polymerizing conditions in a plurality of reaction zones arranged in parallel flow, and effluence from said reaction zones is passed into a product separating zone, the method of increasing the production of polymer having twelve carbon atoms to the molecule which comprises, separating from said effluence in said product separating zone a normally gaseous fraction comprising normally gaseous hydrocarbons having less than four carbon atoms to the molecule, a polymer fraction comprising polymers having from eight to ten carbon atoms to the molecule, and a higher boiling polymer fraction comprising polymers having twelve carbon atoms to the molecule, combining said normally gaseous fraction with said normally gaseous hydrocarbon feed, and recycling said polymer fraction having from eight to ten carbon atoms to the molecule to all but one of said reaction zones, thereby polymerizing propylene in the absence of any added propylene polymers in one of said reaction zones and polymerizing propylene in the presence of propylene polymers having from eight to ten carbon atoms to the molecule but in the absence of any substantial amount of polymers having from four to seven carbon atoms to the molecule in all but one of said reaction zones.

11. In a process for the production of propylene polymer wherein a normally gaseous hydrocarbon charge comprising propylene is contacted with a phosphoric acid polymerization catalyst at propylene polymerizing conditions in a plurality of reaction zones arranged in parallel flow, and effluence from said reaction zones is passed into a product separating zone, the method of increasing the amount of propylene tetramer produced which comprises, separating from said effluence in said product separating zone a normally gaseous fraction comprising propylene, an intermediate polymer fraction boiling in the range of from about 125° C. to about 155° C., and a higher boiling polymer fraction comprising propylene tetramer, combining said normally gaseous fraction with said normally gaseous charge, and recycling said intermediate polymer fraction from said product separating zone to all but one of said reaction zones, thereby polymerizing propylene in the absence of recycled polymer in one of said reaction zones, and polymerizing propylene in the presence of recycled propylene polymer boiling in the range of from about 125° C. to about 155° but in the absence of any substantial amount of reaction products boiling in the range of from about 60° C. to about 125° C. in all but one of said reaction zones.

GEORGE PUTNAM HINDS, Jr.
WILLIAM KEDDIE MEERBOTT.
GORDON J. RENO.

REFERENCES CITED

The following references are of record in the file of this patent:

UNITED STATES PATENTS

| Number | Name | Date |
|---|---|---|
| 2,332,298 | Clarke et al. | Oct. 19, 1943 |
| 2,486,533 | Mayland et al. | Nov. 1, 1949 |